United States Patent [19]

Hojnacki

[11] Patent Number: 5,392,486
[45] Date of Patent: Feb. 28, 1995

[54] DEPRESSED PARK MECHANISM FOR A WINDSHIELD WIPER SYSTEM

[75] Inventor: George Hojnacki, Oakland City, Mich.

[73] Assignee: Trico Products Corporation, Buffalo, N.Y.

[21] Appl. No.: 20,776

[22] Filed: Feb. 22, 1993

[51] Int. Cl.6 .............................. B60S 1/06; B60S 1/34
[52] U.S. Cl. .............................. 15/250.16; 15/250.30; 15/250.13; 74/70; 74/75; 74/600; 74/42; 74/601
[58] Field of Search ........... 15/250.16, 250.13, 250.17, 15/250.3, 250.31; 74/70, 75, 600, 51, 527, 96, 595, 526, 42, 40, 601

[56] References Cited

U.S. PATENT DOCUMENTS

| | | | |
|---|---|---|---|
| 2,491,697 | 12/1949 | Vischulis, Jr. | 74/70 |
| 2,513,247 | 6/1950 | Mortor | 74/601 |
| 3,242,767 | 3/1966 | Simpson | 74/600 |
| 4,559,845 | 12/1985 | Fallows | 15/250.16 |
| 4,597,129 | 7/1986 | Fustache et al. | 15/250.16 |
| 4,610,046 | 9/1986 | Buschur et al. | 15/250.16 |
| 4,878,398 | 11/1989 | Heinrich | 74/600 |
| 4,947,507 | 8/1990 | Naiki | 15/250.16 |

Primary Examiner—Timothy F. Simone
Assistant Examiner—Gary K. Graham
Attorney, Agent, or Firm—Joseph G. Nauman; Timothy E. Nauman

[57] ABSTRACT

A windshield wiper system incorporates a depressed park mechanism that stores a wiper blade in a depressed, park position. Actuation of the motor in one direction moves the blade out of its park position and into an operative position where it reciprocates through a predetermined wipe pattern. De-actuation of the wipe system then repositions the blade in its depressed park position by simply reversing rotation of the motor and altering the effective length of the drive link assembly.

20 Claims, 9 Drawing Sheets

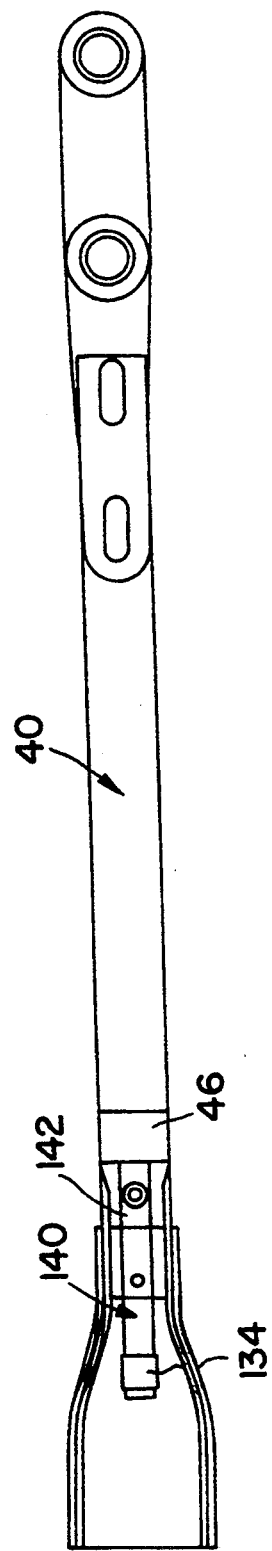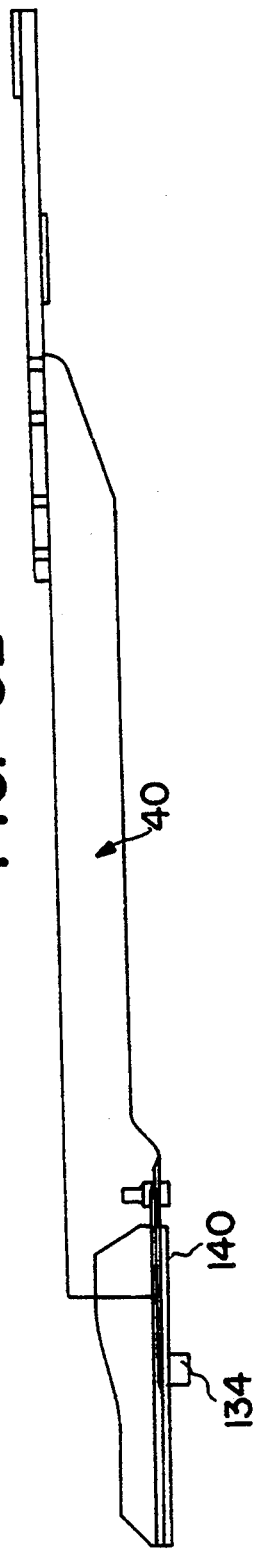

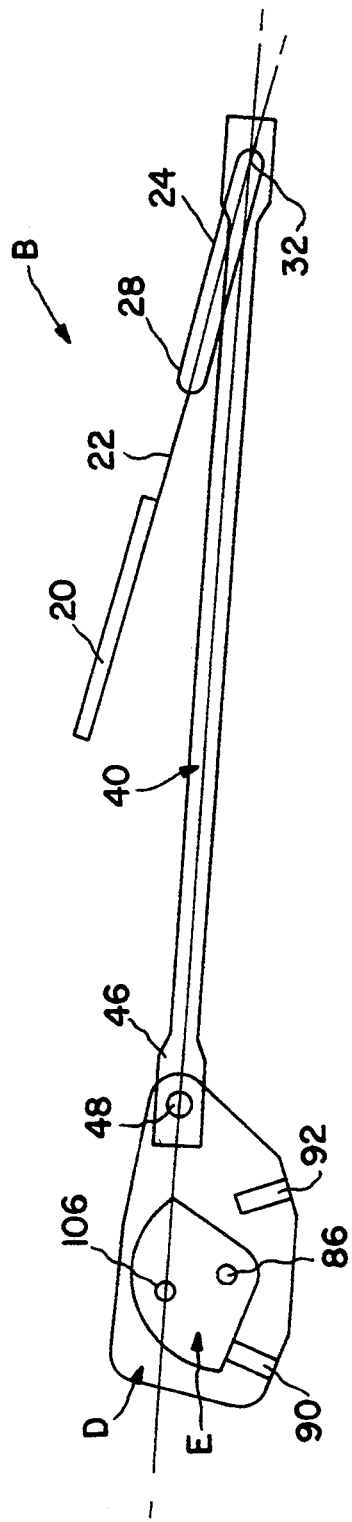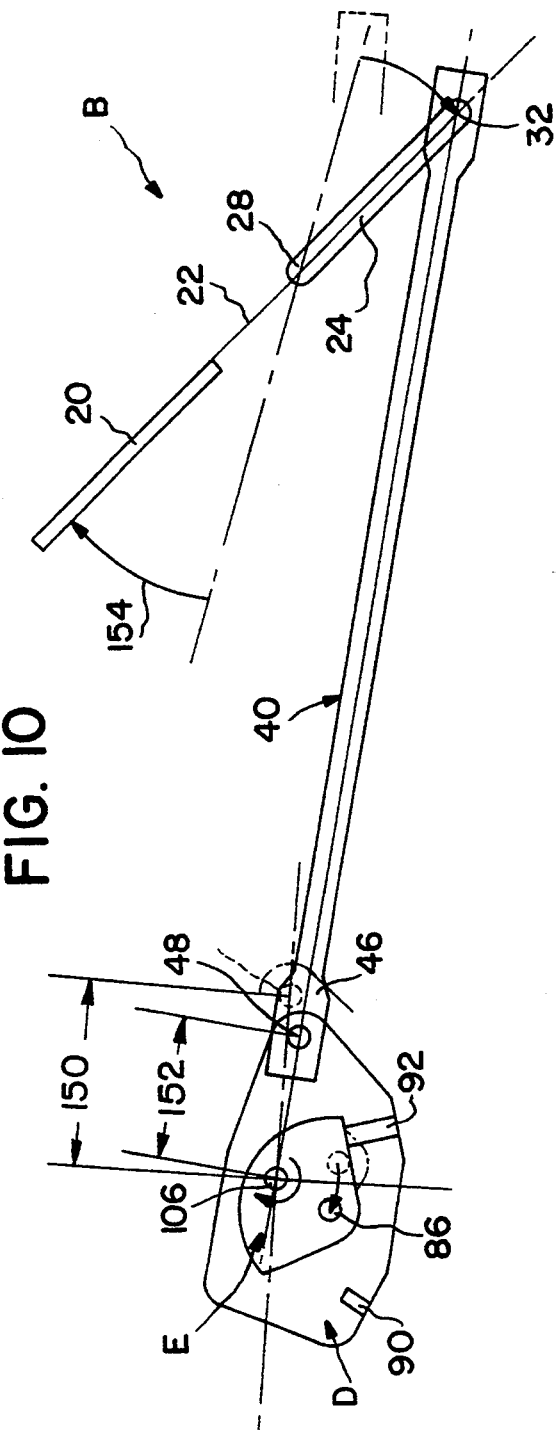
FIG. 9
FIG. 10

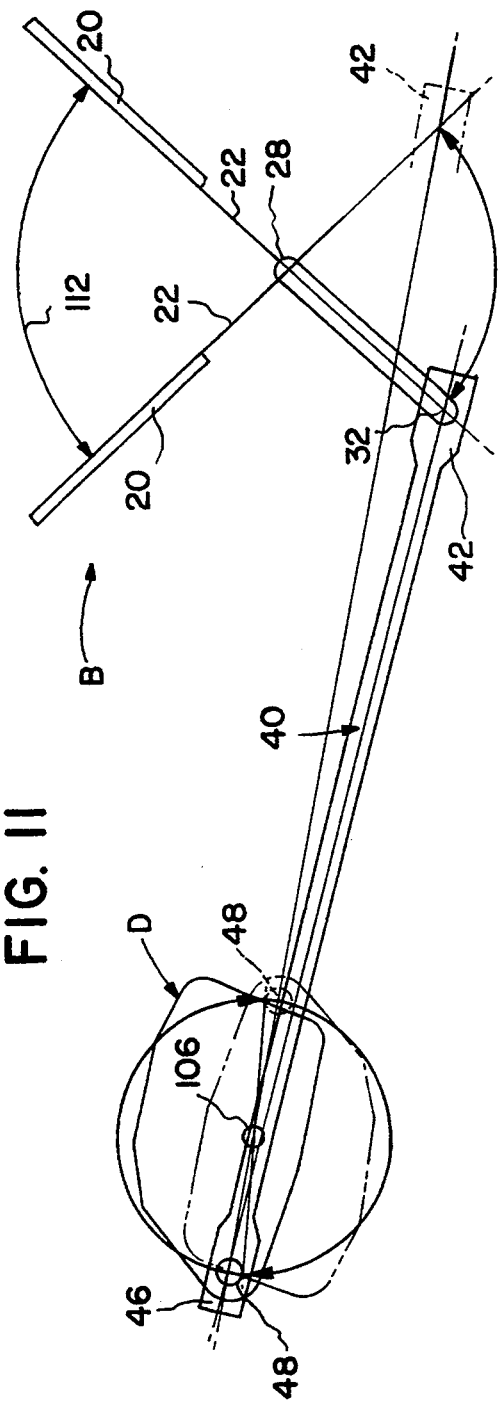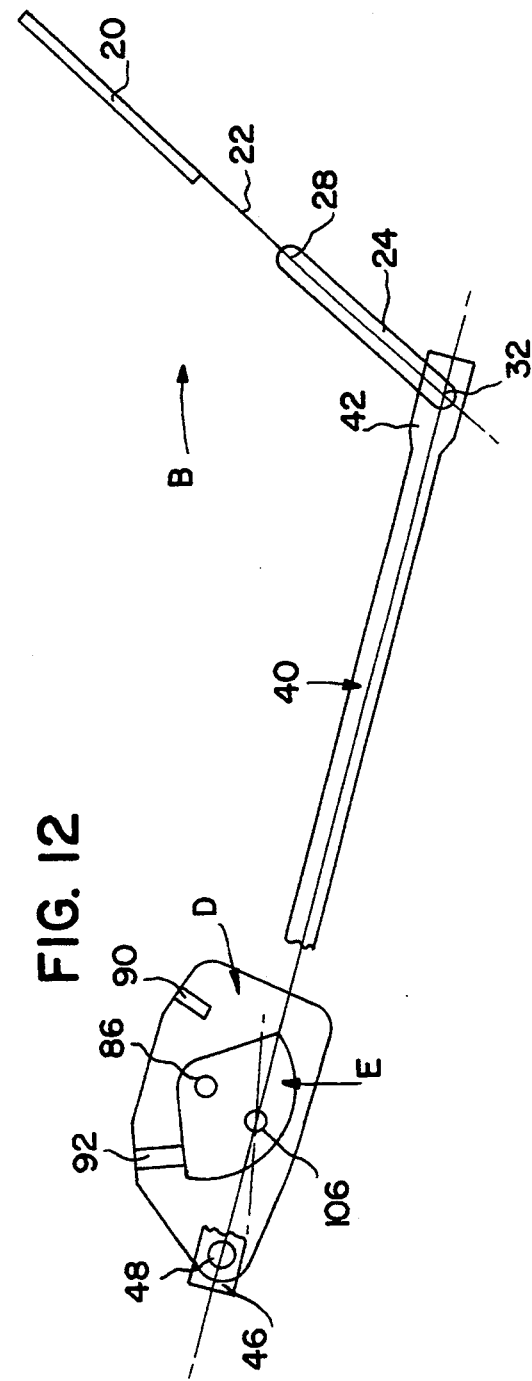

DEPRESSED PARK MECHANISM FOR A WINDSHIELD WIPER SYSTEM

BACKGROUND OF THE INVENTION

This invention pertains to the art of windshield wiper systems, and more particularly to a depressed park mechanism that positions a wiper in a rest or storage position outside of a wipe area. The invention is particularly applicable to an automotive windshield where increased emphasis is placed on windshield designs requiring a low profile or aerodynamic configuration and will be described with particular reference thereto. However, it will be appreciated that the invention has broader applications and may be advantageously employed in other wiper environments and applications.

It is generally known in the art to provide a drive mechanism interposed between a drive motor and wiper blade so that rotation of the motor in one direction reciprocates the wiper blade through a predetermined wipe area and upon reversal of the motor, positions the wiper blade outside the wipe area at a so-called storage or depressed park position. In some instances, the park position is located at an area below a cowl of the vehicle where the wiper blade is stored, protected and does not interfere with a driver's view through the windshield. For example, U.S. Pat. Nos. 4,878,398; 4,610,046 and 4,597,129 generally illustrate known arrangements of this type that operate the wiper blade through a predetermined wipe area and reverse rotation of the drive motor to store the wiper blade at a park position.

Generally speaking, known park mechanism arrangements suffer from one or more problems. For example, many are rather complicated in design. Not only are such complicated designs difficult to manufacture, but oftentimes are particularly configured for a selected automotive design. That is, modifications must be made in the assembled components to accommodate varying wipe areas and park positions that may be encountered from one class or design of vehicle to another.

It is also important that a depressed park mechanism not only function and operate efficiently, but also be adapted for long life, and resistant to wear and tear.

Still another consideration that must be addressed is an increased emphasis on aerodynamic designs for automotive vehicles that have resulted in low profile or swept-back windshield configurations. These low angle, large surface area windshields present a unique set of problems for the windshield wiper industry. Of particular concern with respect to a depressed park mechanism is the need to provide a long stroke park position. That is, the normal wipe area of the windshield must be adequately served by the wiper blade and the blade must then be easily retracted to a depressed location remote from the wipe area.

Still another problem associated with prior art structures is the inability to easily adjust the depressed park arrangement. For a number of different reasons, it may be desired to slightly alter the wipe area traversed by the blade. Additionally, it may be desired to adjust the final park position of the wiper blade. Unfortunately, to accomplish either of these objectives with prior arrangements, it is typically necessary to redesign, or at the very least disassemble, modify, and reassemble the mechanism.

SUMMARY OF THE INVENTION

The present invention contemplates a new and improved depressed park mechanism that overcomes all of the above referenced problems and others and provides a simple, rugged design that is easily adjustable.

According to the present invention, the windshield wiper system includes a drive shaft selectively rotated in opposite directions by a drive motor. An actuator lever and drive link are secured together and cooperate with the drive shaft to selectively alter the location of a wiper blade assembly to define a first or park position and a second or wipe pattern position.

According to a more limited aspect of the invention, the first and second positions may be selectively altered.

According to another aspect of the invention, the actuator lever and drive link are pivotally secured together for selective, relative movement, and locking means selectively locks the actuator lever and drive link together to rotate in unison.

A principal advantage of the invention resides in a simplified and rugged design of the depressed park mechanism.

Another advantage resides in the ease with which the assembly can be adjusted to alter the park position or the wipe pattern of the wiper blade without disassembling the system.

Still another advantage is found in the long stroke achieved with the present design that is particularly useful with new aerodynamic windshield designs.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 8A is a plan view of a connecting arm used in accordance with the subject invention;

FIG. 8B is an elevational view of the connecting arm of FIG. 8A;

FIG. 9 is a schematic representation of the depressed park mechanism in the park position;

FIG. 10 is a schematic representation illustrating the wiper blade at the bottom of the wipe pattern, the showings in phantom illustrating the position of selected components of the wiper blade mechanism in the park position of FIG. 9;

FIG. 11 is a schematic representation of the operation of the wiper mechanism through a predetermined wipe area in response to rotation of the drive motor in a first direction;

FIG. 12 is a schematic representation of the position of the depressed park mechanism and wiper blade when the motor is stopped, and just prior to reversed rotation.

DETAILED DESCRIPTION OF THE PREFERRED EMBODIMENT

Figure 4:
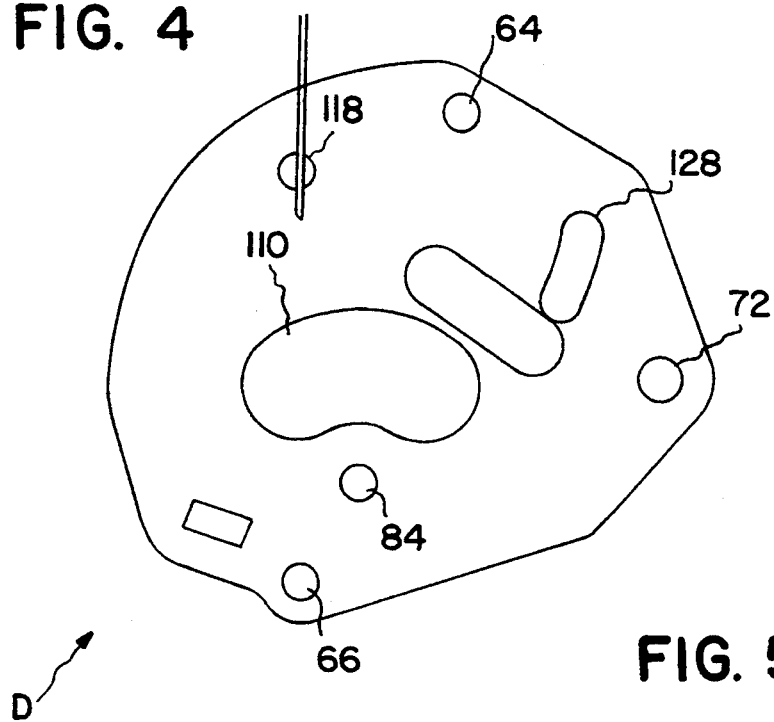
FIG. 4 is a plan view of one of a pair of components or drive links used in accordance with the subject invention.
Figure 5:
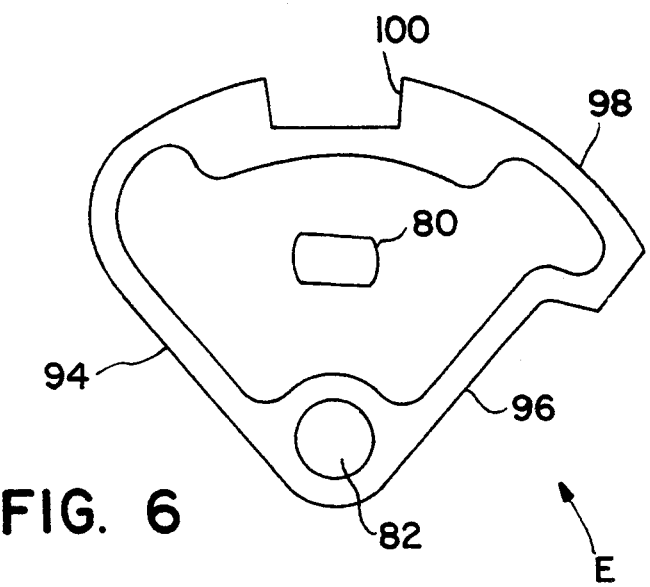
FIG. 5 is a plan view of another component or actuator lever used in accordance with the subject invention.
Figure 6:
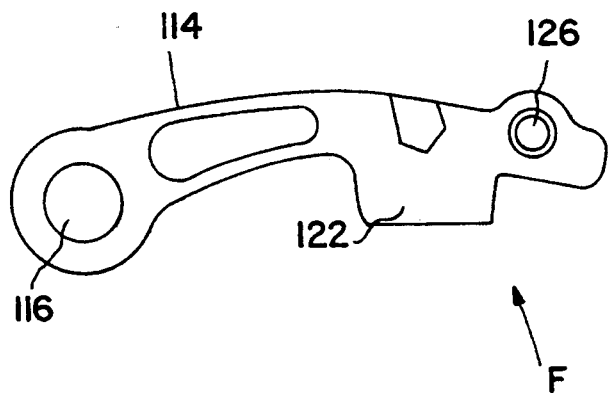
FIG. 6 is a plan view of a means for selectively locking the drive links and actuator lever of FIGS. 4 and 5 together.
Figure 7:
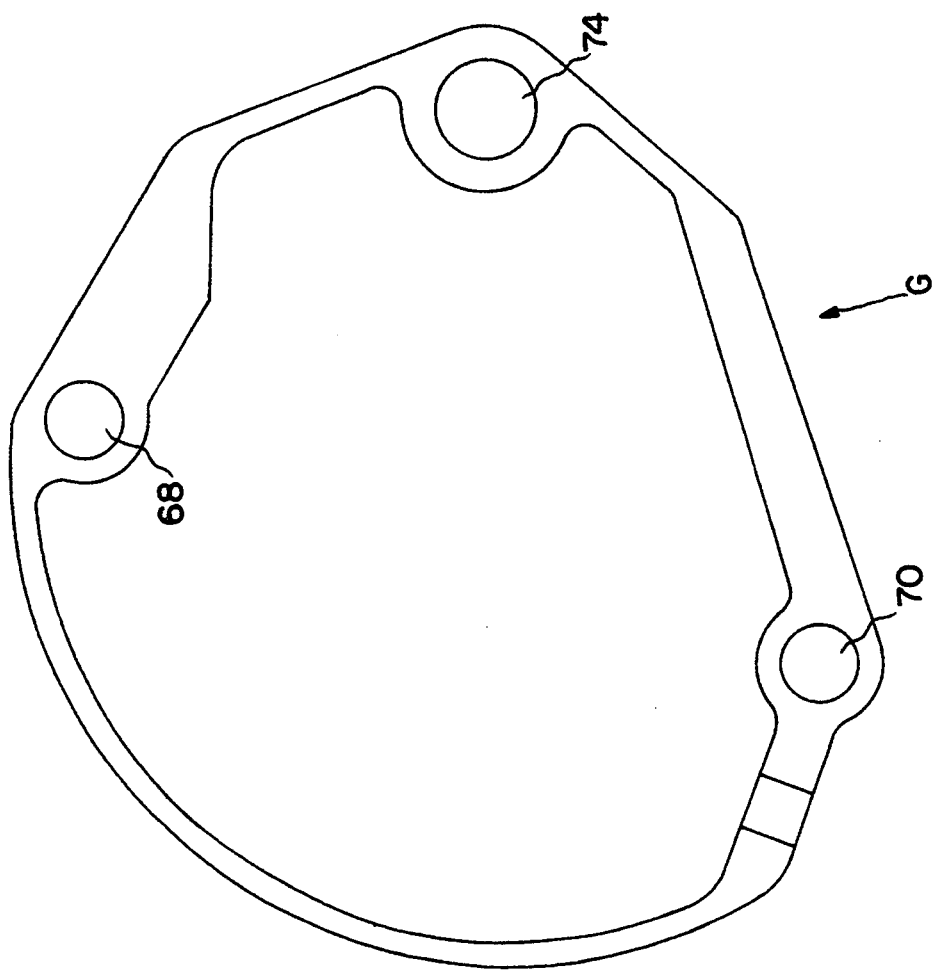
FIG. 7 is a plan view of a spacer received between the drive links of FIG. 4.
Figure 13:
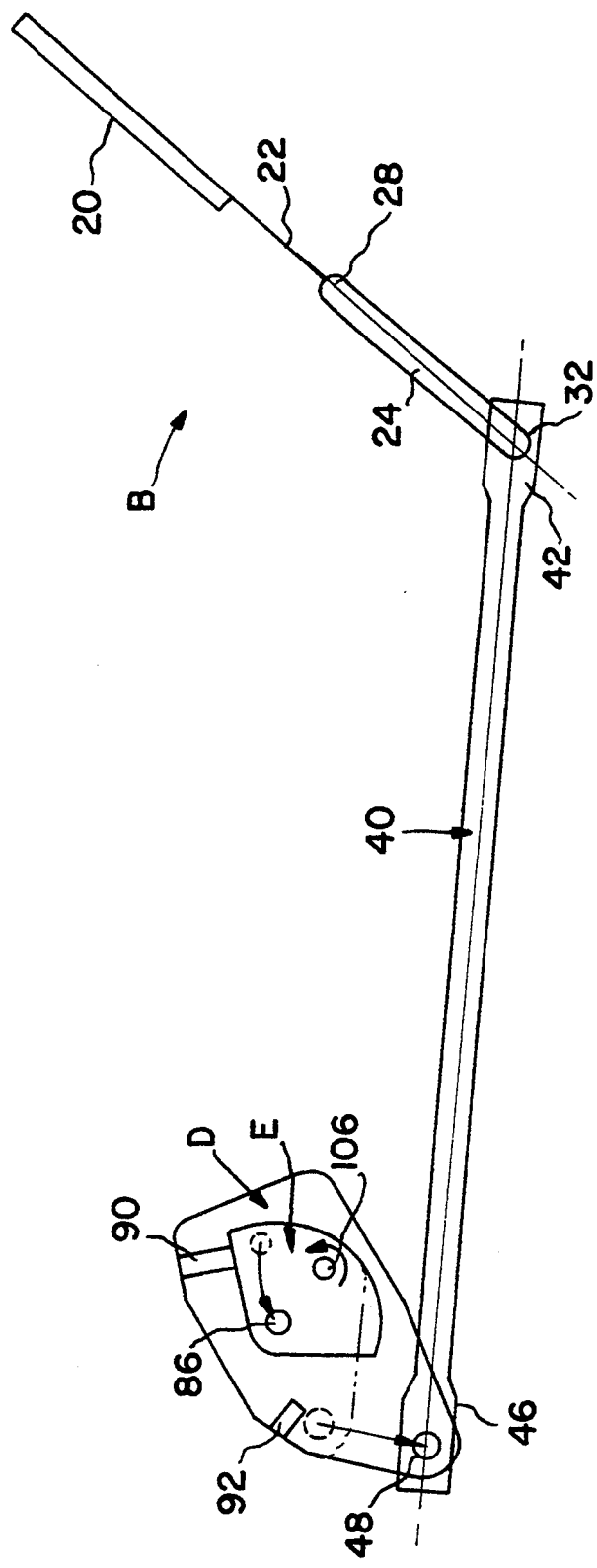
FIG. 13 is a schematic representation of the depressed park mechanism after predetermined rotation in the reverse direction.

Referring now to the drawings which illustrate a preferred embodiment of the invention only and are not intended to limit same, the FIGURES show a windshield wiper system A comprising a wiper blade assembly B and depressed park mechanism C. The major components of the depressed park mechanism include a pair of drive links D (FIG. 4) received on opposite sides of an actuator lever E (FIG. 5). The drive links and actuator lever are selectively locked for unitary rotation by a locking means F (FIG. 6), while a spacer G (FIG. 7) maintains a spaced relationship of drive links on opposite sides of the actuator lever.

Figure 1:
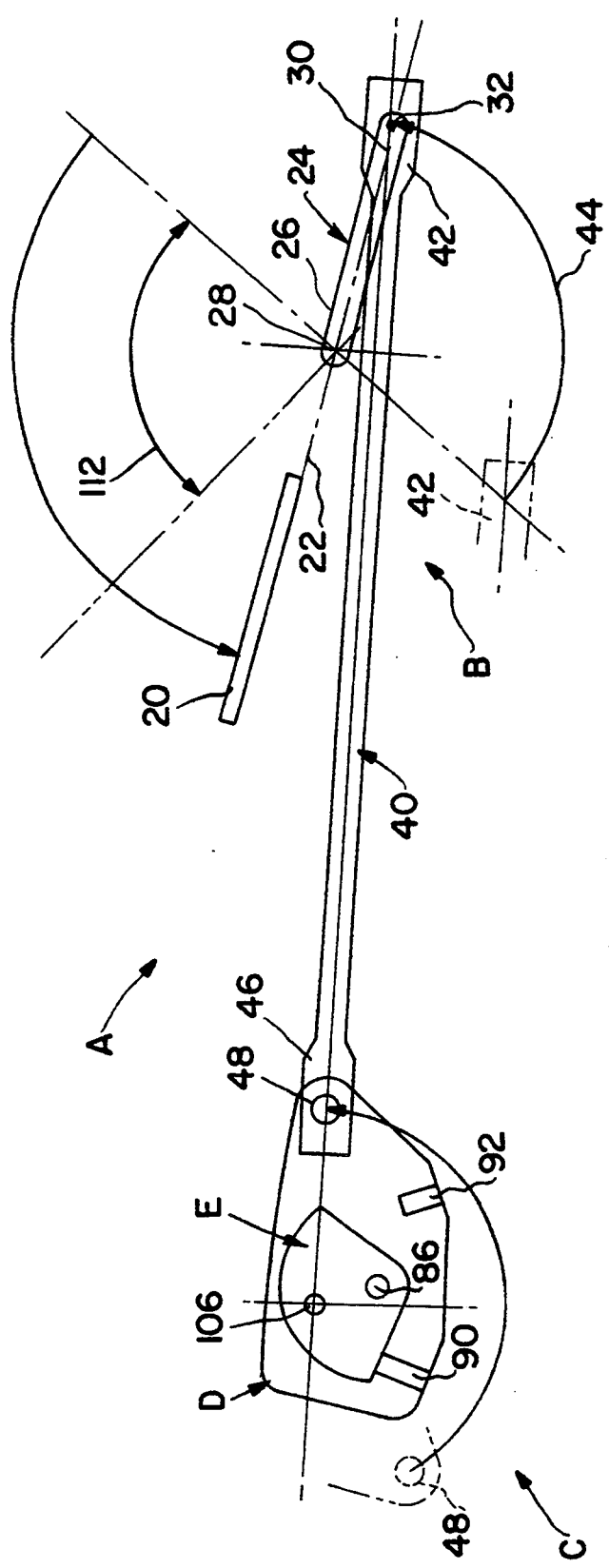
FIG. 1 is a schematic representation of the subject depressed park mechanism used in a windshield wiper system.

More particularly, and with initial reference to FIG. 1, the blade assembly B includes a blade 20, that may be any well known conventional blade structure, mounted on a wiper arm 22 by means of a harness or other conventional connecting structure, the details of which are not shown, nor deemed necessary to a full and complete understanding of the subject invention. The wiper arm is secured to a pivot lever 24, particularly a first end 26 thereof. The wiper arm and pivot lever rotate together about a wiper pivot 28. A second end 30 of the pivot lever is rotatably secured by a first pivot connection means 32 to an elongated connecting arm 40.

More particularly, a first end 42 of the connecting arm receives the connection means, such as pin 32, therethrough for selective pivoting of the pivot lever through a range of movement generally represented by arrow 44. As will be understood, the wiper blade travels through this same angular range of movement in response to reciprocating movement of the pivot lever about the wiper pivot 28. A second end 46 of the connecting arm is secured to the depressed park mechanism C through a second pivotal connection means, for example defined by pin 48.

Figure 2:
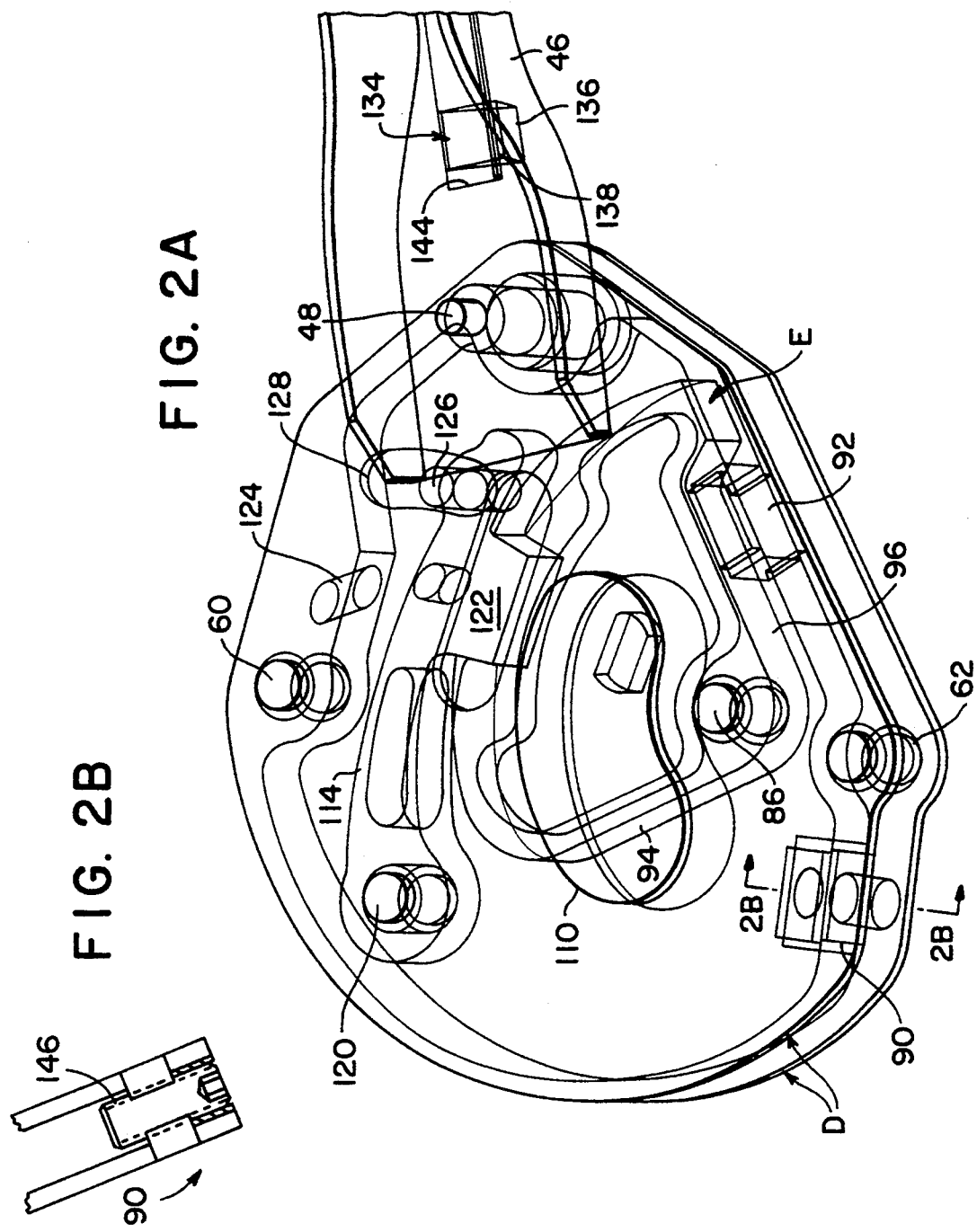
FIG. 2A is an enlarged perspective view of a portion of the depressed park mechanism.
FIG. 2B is a cross-sectional view taken generally along the lines 2B—2B in FIG. 2A.
Figure 3:
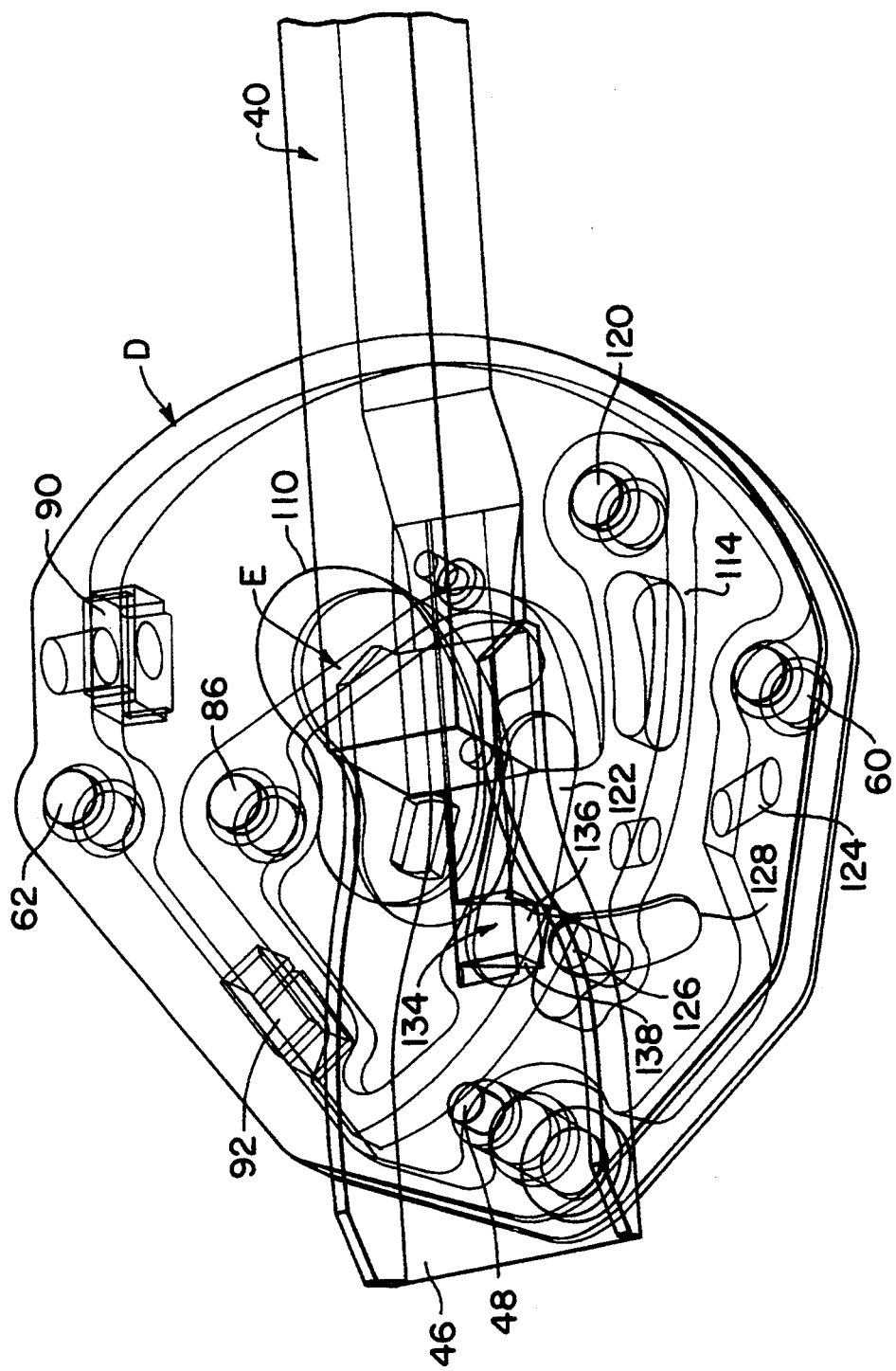
FIG. 3 is a perspective view of the same depressed park mechanism shown in FIG. 2A but at a different point of operation or rotation.

With continued reference to FIG. 1, and additional reference to the assembled views of the second end of the connecting arm and depressed park mechanism in FIGS. 2A and 3, and additionally the individual component illustrations of FIGS. 4-8, it is shown that the depressed park mechanism C is comprised of four major components. Specifically, a pair of drive links D (FIG. 4) sandwich an actuator lever E (FIG. 5) therebetween. A locking means F is also located between the drive links to selectively preclude relative movement between the actuator lever and drive links. Lastly, a spacer G (FIG. 7) closes off the peripheral space between the drive links D and prevents entry of foreign matter into the mechanism.

As will be apparent to one skilled in the art, although a pair of drive links D are illustrated, the principles are fully applicable to an arrangement that would use only a single drive link. Moreover, for purposes of this description, the drive links D will be referred to in the singular, description of one being applicable to the other unless particularly noted otherwise. A pair of fasteners 60, 62 extend through each of the drive links and the spacer G. Openings 64, 66 in the drive link are aligned with openings 68, 70 in the spacer to assure proper orientation of these drive mechanism components. Moreover, opening 72 in the drive link and opening 74 in the spacer receive the pin 48 that pivotally interconnects the depressed park mechanism with the connecting arm.

The actuator lever E includes a central irregularly configured opening 80, for reasons which will become more apparent below, as well as a pin receiving opening 82. The opening 82 is aligned with opening 84 in the drive link to receive a pin connection means 86. As will be described in greater detail below, the pin connection means allows the actuator lever E to move relative to the drive link D, specifically, the actuator lever rotates between first and second positions defined by stop members 90, 92 in response to rotation of the drive motor.

As illustrated in FIG. 5, the actuator lever is generally wedge-shaped having diverging side walls 94, 96 that intersect at one end adjacent the opening 82 and are interconnected at their opposite ends by a generally arcuate wall 98. The arcuate wall also includes a cutout or recess 100, again, for purposes which will be described further below. The irregular shaped opening 80 is adapted to receive a drive shaft 106 that extends from a drive motor (not shown). Any suitable motor and transmission arrangement can be used to provide selective rotation of the drive shaft in clockwise and counterclockwise directions. Because of the irregular shaped opening 80, the actuator lever E rotates with the drive shaft.

As illustrated in FIG. 2A, rotation of the drive shaft in the clockwise direction likewise rotates the actuator lever in a clockwise direction about the pin 86 until side wall 96 abuts the second stop member 92. Continued clockwise rotation of the drive shaft will then rotate both the actuator lever and drive link, as well as the connecting arm second end 46. Rotation in the opposite direction urges the actuator lever side wall 94 into engagement with the stop member 90. Again, once the abutting engagement is established, the drive link and connecting arm second end will then rotate in conjunction with the actuator lever.

As apparent from the above description, there are periods of movement where the actuator lever and drive link move relative to one another. For example, changing the direction of rotation results in relative movement between these drive mechanism components. The actuator lever pivots about the pin 86 as it proceeds from one stop member to the other, and during this "lost motion" movement, the drive link and connecting arm remain stationary.

The relative movement between the actuator lever and drive link about the pin is guided by means of arcuate slot 110 (FIG. 4) formed in the drive link and centered about pin 86. The slot has a circumferential extent sufficient to permit the actuator lever to move between the most remote locations of the adjustable first and second stop members 90, 92. Since at least one of the stop members is adjustable relative to the drive link by means of its securing arrangement, the angular extent of movement of the actuator lever can be slightly modified as desired. This, in turn, defines the extent of lost motion or relative movement between the actuator lever and drive link before the components rotate in unison.

When the side wall 96 abuts stop member 92, and the drive shaft continues to rotate in a clockwise manner as shown, the wiper blade is reciprocally driven across a predetermined wipe pattern represented by numeral 112 in the drawings. To assure that the drive forces from the shaft 106 are effectively transmitted through the actuator lever, drive link, and connecting arm, a locking means F (FIG. 6) that includes a hook arm 114 is pivotally secured to the drive link. More particularly, the hook arm has an opening 116 at one end that is aligned with opening 118 in the drive link. The aligned openings receive a fastener 120 therethrough so that hook arm 114 rotates about the fastener 120 and into and out of selective engagement with the actuator lever. A projection 122 is provided on the hook arm and is selectively received in the recess 100 of the actuator lever. Moreover, a biasing means such as spring 124 (FIG. 2A) normally urges the hook arm projection toward the actuator lever. When the actuator lever abuts against the stop member 92, the recess and projection are aligned so that continued rotation of the drive shaft in a clockwise direction assures that the drive link and actuator lever rotate in unison.

At the opposite end of the hook arm, a pin 126 extends through an elongated arcuate slot 128 in the drive link. This slot 128 is centered on the fastener 120 so that the hook arm can be selectively rotated away from the actuator lever and against the biasing force of spring 124 in a manner to be described in greater detail below.

The second end 46 of the connecting arm rotates with the drive link via the second pivotal connection means 48. Also, provided on the second end 46 is a disengaging means that includes a tab 134 that projects outwardly through an opening in the connecting arm. The tab has a wedge-shaped configuration, best illustrated in FIG. 2A, in which a perpendicular face 136 is adapted to selectively abut against the pin 126 in one direction of movement of the drive shaft, and to slide thereover in the opposite direction of rotation. Thus, as the depressed park mechanism rotates in a clockwise direction via drive shaft 106, the projecting tab, particularly angled face 138 thereof, slides over the pin 126. In the opposite direction of rotation of the drive shaft, the tab engages the pin by means of perpendicular face 136 and moves the pin along arcuate slot 128. When the hook arm is moved against the biasing force of the spring by the projecting tab, the actuator lever and drive link are then free to move relative to one another. This permits the actuator lever to move away from stop member 92 and toward stop member 90.

When rotating in the clockwise direction, the projecting tab may be deflected over the pin 126 when it contacts the pin 126. More particularly, the tab 134 is mounted on one end of a flat spring 140 that is secured at its opposite end 142 to the connecting arm. The tab extends through the opening 144 in the connecting arm and is normally biased through the opening and toward engagement with the pin 126 by means of the spring 140 (FIGS. 8A, 8B).

FIG. 2B illustrates in greater detail the adjustability of one of the stop members, particularly the park position stop member 90. Because of the locking means described above, the stop member 92 need not be adjustable. The park position stop member, though, is preferably adjustable so that once the depressed park mechanism is mounted on a vehicle, fine tune adjusting or locating can be made to the assembly to define the park position. According to a preferred arrangement, the stop member 90 is adjusted by means of a tool such as a screwdriver or allen-type wrench and advanced or retracted relative to the remainder of the drive link D. As shown, this is possible because the stop member includes or is defined by a threaded member 146 that can be advanced or retracted relative to the drive link by means of a tool. Of course, other adjustable arrangements can be used without departing from the scope and intent of the subject invention.

With continued reference to FIGS. 2-8, and reference to FIGS. 9-13, operation of the depressed park mechanism for the windshield wiper system will be more particularly described. As shown in FIG. 9, the actuator lever E abuts against the first stop member or park position adjustor 90. The drive motor is deactuated or "off" and the windshield wiper system disposed in its normal park position. Thus, the wiper blade assembly B is preferably located at a storage position which in the illustrated embodiment is between the nine and ten o'clock positions. When the drive motor is actuated, initial rotation of the drive shaft is in a clockwise direction (FIG. 10). The clockwise rotation of the drive shaft pivots the actuator lever relative to the drive link about the pin connection means 86 and into abutting engagement with the second stop member 92. Thus, although the rotational orientation of the drive link is not substantially altered as shown by a comparison of FIGS. 9 and 10, the effective length between the drive shaft 106 and the pin connection means 32 has been altered. More particularly, the effective length between the drive shaft and the second pivotal connection means 48 is reduced from a dimension represented by numeral 150 to the dimension represented by numeral 152 (FIG. 10). In other words, the effective length of the park mechanism in the park position is greater than the effective length in the run position. This re-orients the position of the blade assembly B, rotating it in a clockwise direction about wiper pivot 28. The blade rubber 20 is, therefore, moved through an angular range represented by arrow 154.

As illustrated in FIG. 11, continued clockwise rotation of the drive shaft oscillates or reciprocates the blade through a predetermined angular extent defined as the wipe area 12. As described above, the hook arm projection 122 is disposed in the recess 100 of the actuator lever to interlock the actuator lever and drive means to rotate in unison during operation of the blade through the wipe area.

When a vehicle operator desires to turn the windshield wiper system off, rotation of the drive shaft continues until the depressed park mechanism and blade are located at the position shown in FIG. 12. This corresponds to the rightward most sweep of the blade across the windshield. At that point, rotation of the drive shaft stops and reverses (counterclockwise). This reverse rotation of the drive shaft allows the disengaging means to contact the pin 126 and move the hook arm against the biasing force of spring 124. The actuator lever is then free to move relative to the drive link and shift from abutting engagement with the run position stop member 92 into abutment against the park position stop member or adjustor 90. Continued rotation of the drive shaft 106 in the counterclockwise direction rotates the entire depressed park mechanism to its final park position as shown in FIG. 9. The blade is thus advantageously located in a storage or park position, and the operation repeated when an operator actuates the wiper system.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A windshield wiper system on a vehicle body including a wiper blade assembly oscillated across a windshield by a drive motor, the windshield wiper system comprising:
   a drive shaft adapted to be selectively rotated about an axis of rotation in clockwise and counter-clockwise directions by the drive motor;
   an actuator lever engaging the drive shaft for rotation therewith;
   a first link connected to the actuator lever by a pivot for a limited range of relative movement thereto between first and second positions, the link including a slot receiving the drive shaft therethrough;
   a connecting arm having first and second ends pivotally secured to the first link adjacent the first end and to the wiper blade assembly at the second end, the first position of the link relative to the actuator lever being spaced from the second position to define a wipe position and a park position of the wiper blade assembly; and
   a first stop member adjustably mounted on the first link for relative movement thereto, the first stop member being engageable with the actuator lever and having a member for adjusting its position to thereby alter the extent of movement of the link relative to the actuator lever.

2. The windshield wiper system as defined in claim 1 further comprising a second stop member mounted on the first link also adapted to engage the actuator lever and limit movement of the link about the pivot therebetween.

3. The windshield wiper system as defined in claim 1 further comprising a hook arm pivotally secured to the first link and having a portion adapted to selectively engage and limit movement of the actuator lever between the first and second positions.

4. The windshield wiper system as defined in claim 3 wherein the hook arm portion is adapted to selectively lock the first link in the first position allowing the wiper blade to oscillate across the windshield.

5. The windshield wiper system as defined in claim 4 further comprising means for biasing the hook arm into engagement with the actuator lever.

6. The windshield wiper system as defined in claim 5 further comprising a member on the connecting arm adapted to selectively move the hook arm out of engagement with the actuator lever against the force of the biasing means.

7. The windshield wiper system as defined in claim 6 wherein the member on the connecting arm has an angled face that rides over a pin on the hook arm in one direction of movement of the member on the connecting arm relative to the hook arm and engages the pin to move the hook arm out of engagement with the actuator lever in the opposite direction of movement.

8. A windshield wiper system including a wiper blade assembly, a drive arm connected to said wiper blade assembly, and a post supporting said arm for oscillating motion across a windshield, the windshield wiper system comprising:
   a reversible drive motor having a drive shaft;
   an actuator lever fixed to said drive shaft;
   a drive link at least partially overlying said actuator lever and a pivot connecting said actuator lever to said drive link providing for a predetermined range of relative movement of said actuator lever relative to said drive link between first and second positions, said drive link including an arcuate slot having its center of curvature on said pivot and receiving the drive shaft therethrough;
   a hook arm pivotally mounted on said drive link adapted to engage the actuator lever for selectively locking the actuator lever and drive link against relative movement; and
   a connecting arm defining first and second ends pivotally secured at one of its ends to said drive link and having a connection to said wiper drive arm, the first position of the link relative to the actuator lever being spaced from the second position to define a wipe position and a park position of the wiper blade assembly.

9. The windshield wiper system as defined in claim 8 further comprising an adjustment member on the drive link for altering at least one of the first and second positions of movement of the actuator lever relative to the drive link.

10. The windshield wiper system as defined in claim 8 further comprises a member mounted on the drive link adapted to bias the hook arm into engagement with the actuator lever to prevent relative movement between the actuator lever and the drive link.

11. The windshield wiper system as defined in claim 8 further comprising a member mounted on the connecting arm adapted to disengage the hook arm for engagement with the actuator lever to allow the actuator lever to move relative to the drive link.

12. The windshield wiper system as defined in claim 11 wherein the disengaging member includes a projection extending from the connecting arm.

13. The windshield wiper system as defined in claim 11 wherein the disengaging member is urged by a biasing member toward the hook arm, the biasing member permitting the projection to ride over the hook 14. A windshield wiper system having a blade oscillating through a wipe pattern in response to drive motion imparted by a motor through a connecting arm that connects the blade to the motor, the windshield wiper system comprising:
   a drive link secured to the connecting arm;
   a connection member;
   an actuating lever coupled with a driven shaft of the motor for rotation therewith and pivotally mounted to the drive link through the connection member for selective relative movement between (i) a park position and (ii) a run position, the relative position between the actuating lever and the drive link dependent on directional rotation of the motor so that the blade operates through a predetermined wipe area when the actuating lever and drive link are in the run position and the blade moves to a position outside of the predetermined wipe area when the actuating lever and drive link are in the park position;

first and second stop members mounted on the drive link and defining limits of relative movement between the actuator lever and the drive link, at least one of the stop members is adjustably movable relative to the link such that the extent of movement of the link on the actuating lever can be altered.

15. The windshield wiper system as defined in claim 14 further comprising a first pivot that pivotally secures the blade to the connecting arm.

16. The windshield wiper system as defined in claim 15 further comprising a second pivot that pivotally secures the connecting arm to the drive link.

17. The windshield wiper system as defined in claim 16 further comprising a drive shaft operatively associated with the motor and fixedly secured to the actuator lever, the drive shaft being spaced from the connection member between the actuating lever and the drive link.

18. The windshield wiper system as defined in claim 17 further comprising an arcuate slot in the drive link which cooperates with the drive shaft to guide movement of the actuator lever relative to the drive link.

19. The windshield wiper system as defined in claim 18 further comprising a lock arm connected to the drive link and having a portion that is adapted to selectively engage the actuator lever to provide unitary movement thereof by the drive shaft.

20. The windshield wiper system as defined in claim 19 further comprising means adapted to selectively move the lock arm portion into and out of engagement with the actuator lever.

* * * * *